US010300511B2

(12) United States Patent
Hsu

(10) Patent No.: US 10,300,511 B2
(45) Date of Patent: May 28, 2019

(54) CLEAN METHOD FOR SURVEILLANCE CAMERA

(71) Applicant: VIVOTEK INC., New Taipei (TW)

(72) Inventor: Hsiang-Lin Hsu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 132 days.

(21) Appl. No.: 15/468,967

(22) Filed: Mar. 24, 2017

(65) Prior Publication Data
US 2017/0274428 A1    Sep. 28, 2017

(30) Foreign Application Priority Data

Mar. 25, 2016 (TW) .............................. 105109438 A

(51) Int. Cl.
| | |
|---|---|
| *B60S 1/56* | (2006.01) |
| *B08B 7/02* | (2006.01) |
| *H04N 7/18* | (2006.01) |
| *G02B 27/00* | (2006.01) |

(52) U.S. Cl.
CPC ........ *B08B 7/02* (2013.01); *B60S 1/56* (2013.01); *G02B 27/0006* (2013.01); *H04N 7/183* (2013.01)

(58) Field of Classification Search
CPC ...... B08B 7/02; H04N 7/183; G02B 27/0006; G02B 23/2476; B60S 1/0848
See application file for complete search history.

(56) References Cited

U.S. PATENT DOCUMENTS 5,208,938 A * 5/1993 Webb ................. B60S 1/185
15/250.22
2010/0321473 A1* 12/2010 An ....................... H04N 5/2628
348/47

FOREIGN PATENT DOCUMENTS

JP   2013080177 A  *  5/2013

OTHER PUBLICATIONS

Machine translation of JP2013-080177A dated May 2013 (Year: 2013).*

* cited by examiner

*Primary Examiner* — Douglas Lee
(74) *Attorney, Agent, or Firm* — Maschoff Brennan

(57) ABSTRACT

A clean method is configured for a surveillance camera. The surveillance camera comprises a mounting bracket and a main body which is rotatable relative to the mounting bracket so that the main body is rotatable around at least one rotation axis. The clean method includes the following steps. Drive the main body to rotate in a first path from a prepared position to an end of the first path, which is away from the prepared position, and to strike the mounting bracket to get the main body cleaned. Correct a relative position relationship between the main body and the mounting bracket.

11 Claims, 8 Drawing Sheets

CLEAN METHOD FOR SURVEILLANCE CAMERA

CROSS-REFERENCE TO RELATED APPLICATIONS

This non-provisional application claims priority under 35 U.S.C. § 119(a) on Patent Application No(s). 105109438 filed in Taiwan, R.O.C. on Mar. 25, 2016, the entire contents of which are hereby incorporated by reference.

TECHNICAL FIELD

The disclosure relates to a method, more particularly to a clean method for a surveillance camera.

BACKGROUND

Surveillance technology can be used to monitor and record activities in public places, and it replaces the traditional human guard system. Moreover, surveillance systems can be integrated with optical recognition techniques and security alarm systems, and the security alarm system will be triggered and send out warning signals when a suspicious activity happens in the monitored area. Accordingly, the surveillance systems have become the primary passive security system.

SUMMARY

One embodiment of the disclosure provides a clean method for a surveillance camera. The surveillance camera comprises a mounting bracket and a main body which is rotatable relative to the mounting bracket so that the main body is rotatable around at least one rotation axis. The clean method includes the following steps. Drive the main body to rotate in a first path from a prepared position to an end of the first path, which is away from the prepared position, and to strike the mounting bracket to get the main body cleaned. Correct a relative position relationship between the main body and the mounting bracket.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

Figure 1:
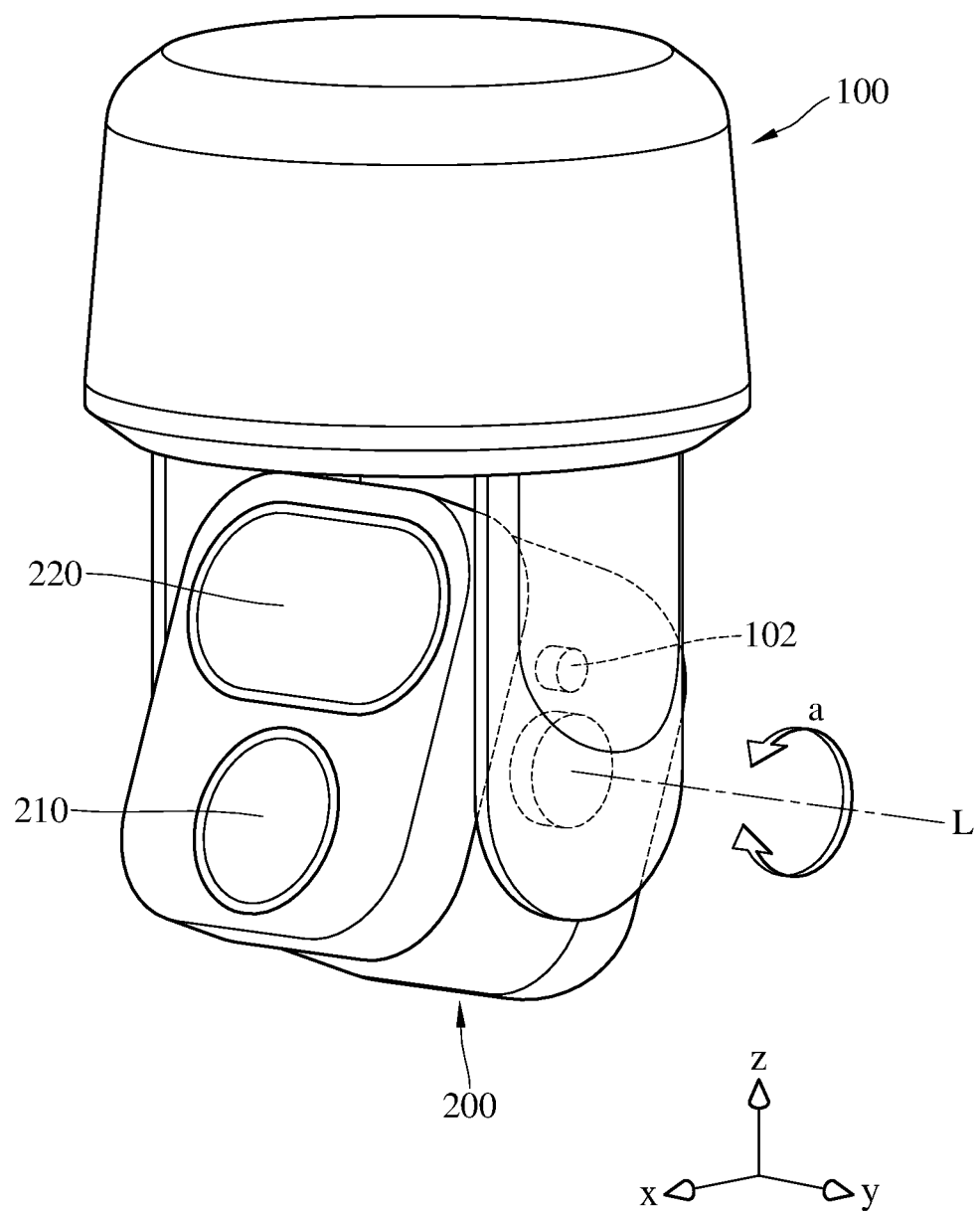
FIG. 1 is a perspective view of a surveillance camera according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
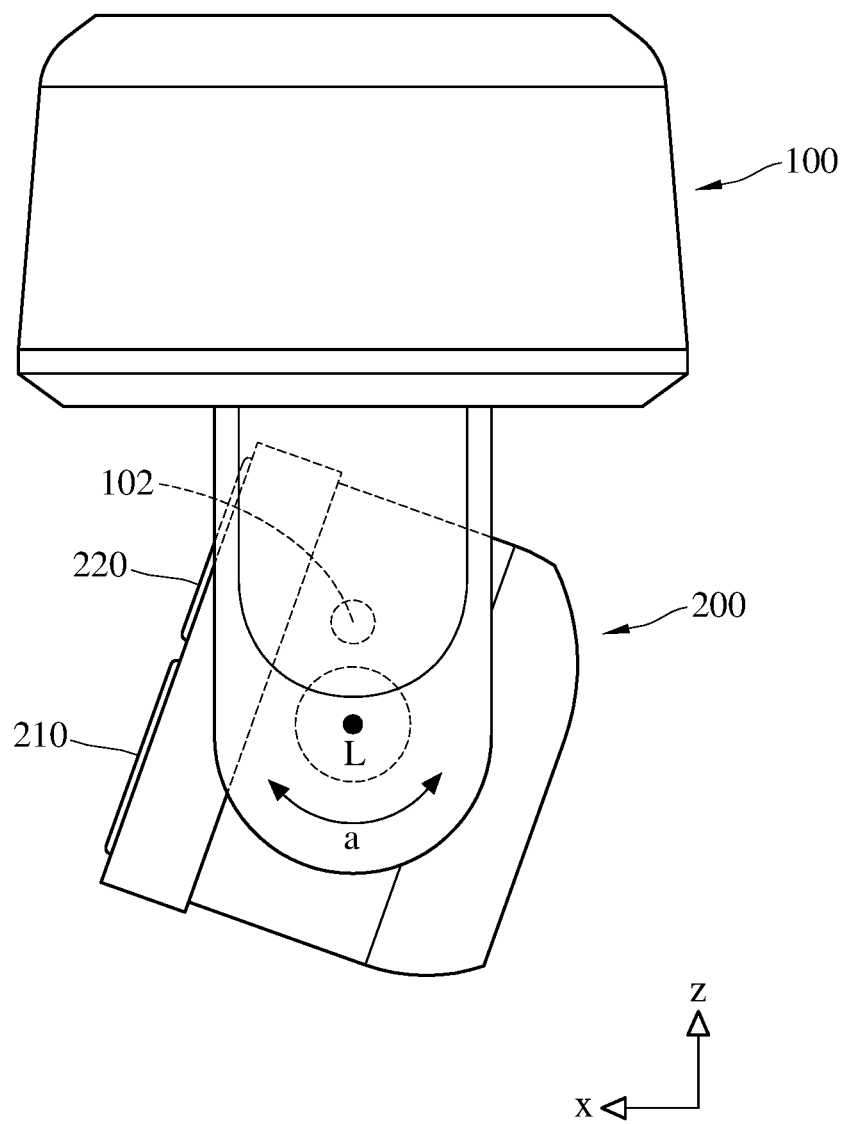
FIG. 2 is a side view of the surveillance camera in FIG. 1.

Please refer to FIG. 1 to FIG. 2. FIG. 1 is a perspective view of a surveillance camera according to a first embodiment of the disclosure, and FIG. 2 is a side view of the surveillance camera in FIG. 1.

In this embodiment, a clean method for a surveillance camera 10 is provided. The surveillance camera 10 includes a mounting bracket 100 and a main body 200. The main body 200 has a lens shield 210 and a light shield 220. A camera lens (not shown) inside the main body 200 is covered by the lens shield 210. A light source (not shown) inside the main body 200 is covered by the light shield 220. The main body 200 is rotatably disposed on the mounting bracket 100, and the main body 200 is rotatable around a rotation axis L. Thus, the main body 200 is rotatable with respect to the mounting bracket 100 in a first path (as indicated by the path of arrow a shown in FIG. 1) in order to change its inclination (or position). In addition, the mounting bracket 100 has a stopper 102. The first path has a first stop end and a second stop end, and the first stop end and the second stop end are respectively located on two sides of the stopper 102 opposite to each other. When the main body 200 strikes one of the two opposite sides of the stopper 102, the main body 200 is stopped by the stopper 102.

It is noted that the present disclosure is not limited to the quantity of the stopper 102. In other embodiments, the surveillance camera may have two stoppers, and the two stoppers are located at the first stop end and the second stop end of the first path, respectively.

Figure 3:
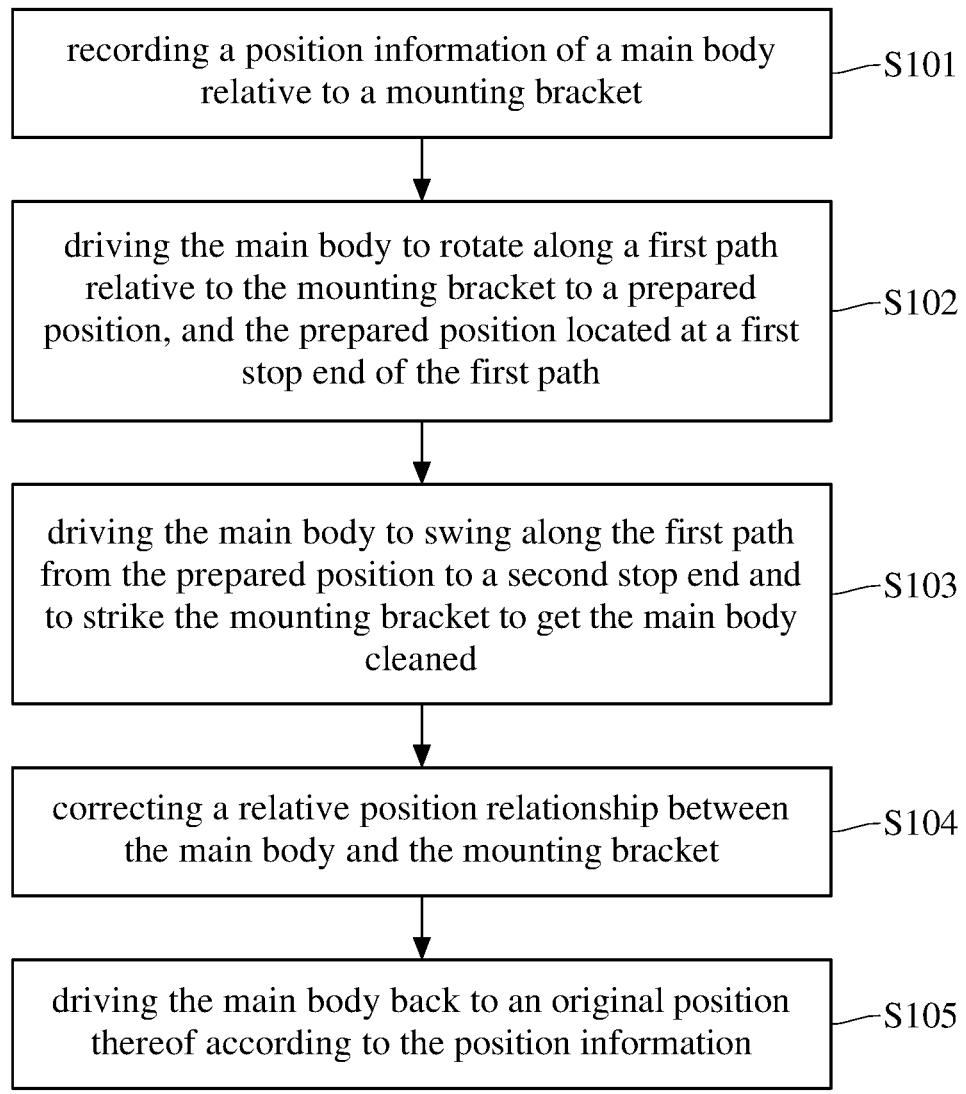
FIG. 3 is a flow chart of a clean method for the surveillance camera in FIG. 1.

Please refer to FIG. 2 to FIG. 7. FIG. 3 is a flow chart of a clean method for the surveillance camera according in FIG. 1. FIG. 4 to FIG. 7 show the processes of the clean method for the surveillance camera in FIG. 1.

Firstly, as shown in FIG. 2, the main body 200 of the surveillance camera 10 is in operation (e.g. monitoring), and the main body 200 is not leaning against the stopper 102 of the mounting bracket 100; that is, the main body 200 is not in contact with the stopper 102 yet.

Then, determine the existence of rain drops or dust attached to the surface of the lens shield 210 of the main body 200 by manual manner or automatic manner, such as using a sensing apparatus.

When there are rain drops or dust attached to the surface of the lens shield 210 of the main body 200, a position information of the main body 200 relative to the mounting bracket 100 is recorded. (as shown in step S101)

Figure 4:
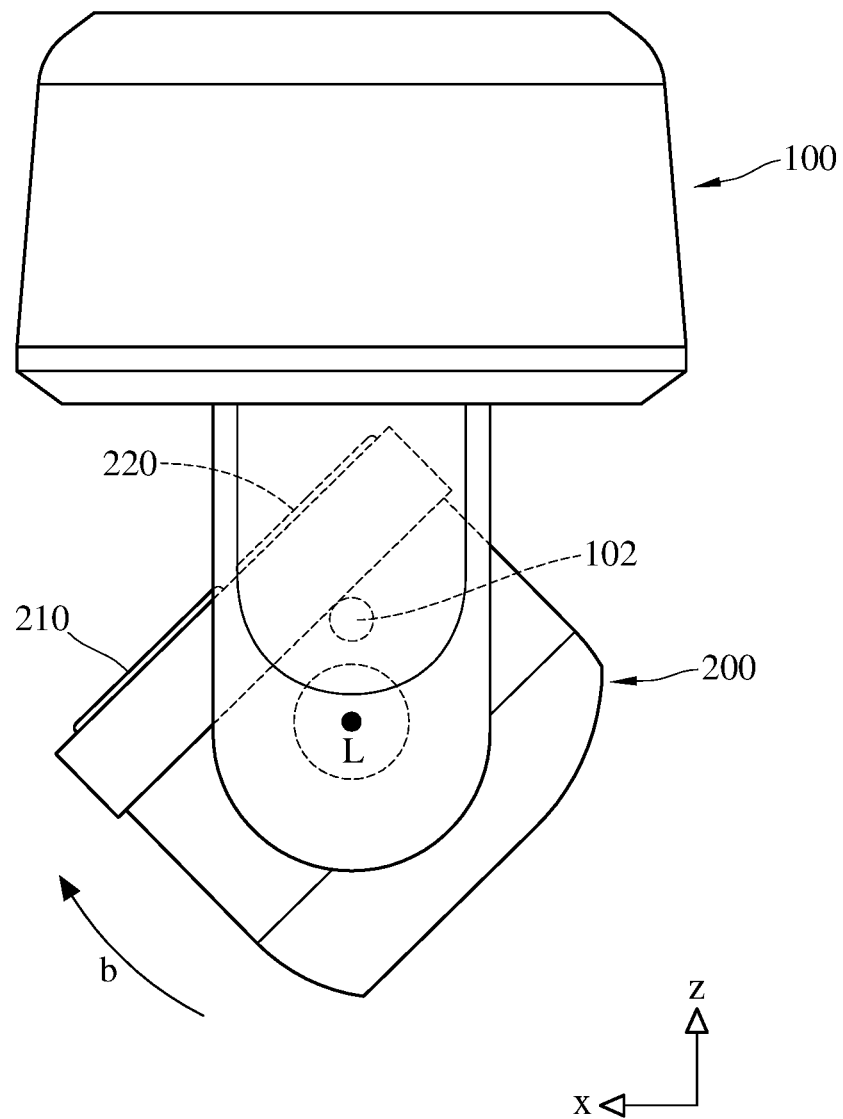
FIG. 4 to FIG. 7 show the processes of the clean method for the surveillance camera in FIG. 1.

Then, as shown in FIG. 4 (as shown in step S102), the main body 200 is driven to rotate relative to the mounting bracket 100 in the first path (as the arrow b shown in FIG. 4) to a prepared position at a first rotational speed. When the main body 200 is at the prepared position, the main body 200 is located at the first stop end of the first path. That is, when the main body 200 is at the prepared position, the main body 200 is leaning against the left side of the stopper 102. In addition, the first rotational speed is, for example, the rotational speed of the main body 200 while the main body 200 is in operation.

Figure 5:
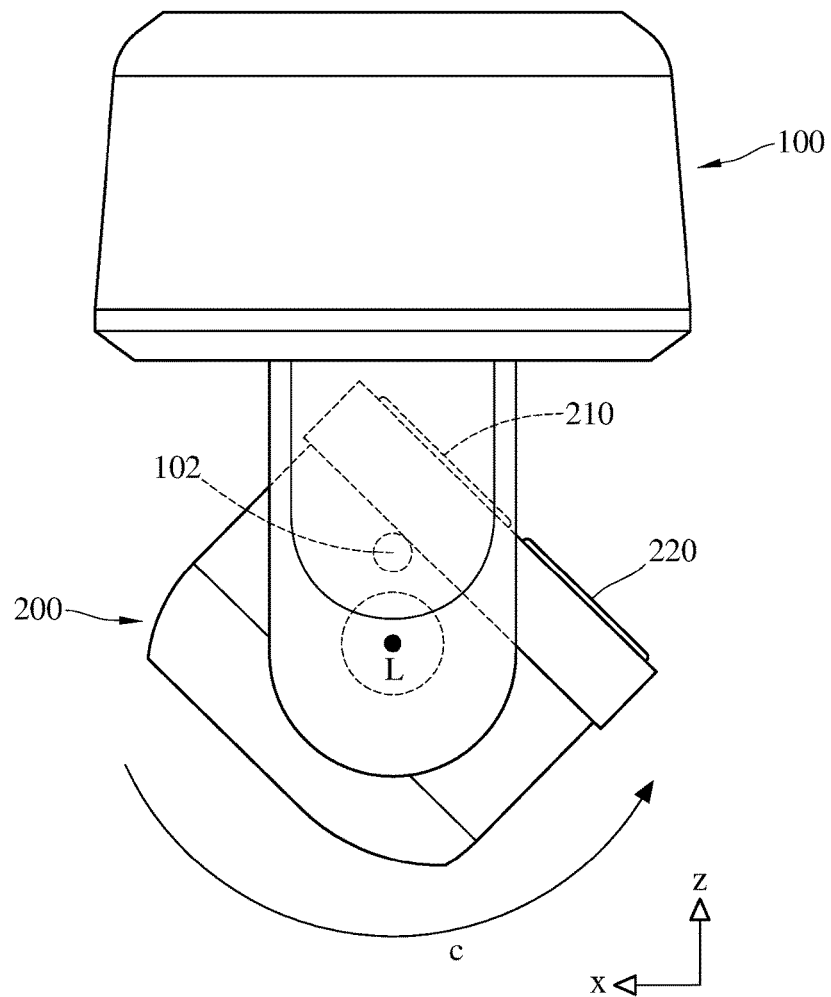

Then, as shown in FIG. 5, the main body 200 is driven to rotate in the first path (as the arrow c shown in FIG. 5) from the prepared position (when the main body 200 is located at the left side of the stopper 102) to the second stop end of the first path at a second rotational speed, thereby causing the main body 200 to strike the mounting bracket 100 (as shown in step S103). As a result, rain drops or dust attached to the surface of the lens shield 210 of the main body 200 is removed by the impact caused by the main body 200 striking the mounting bracket 100. It is noted that the second rotational speed is greater than the first rotational speed. The second rotational speed is, for example, greater than or equal to 240 deg/s so as to increase the strength of the impact caused by the main body 200 striking the mounting bracket 100 and improve the clean performance to the surveillance camera 10.

Figure 6:
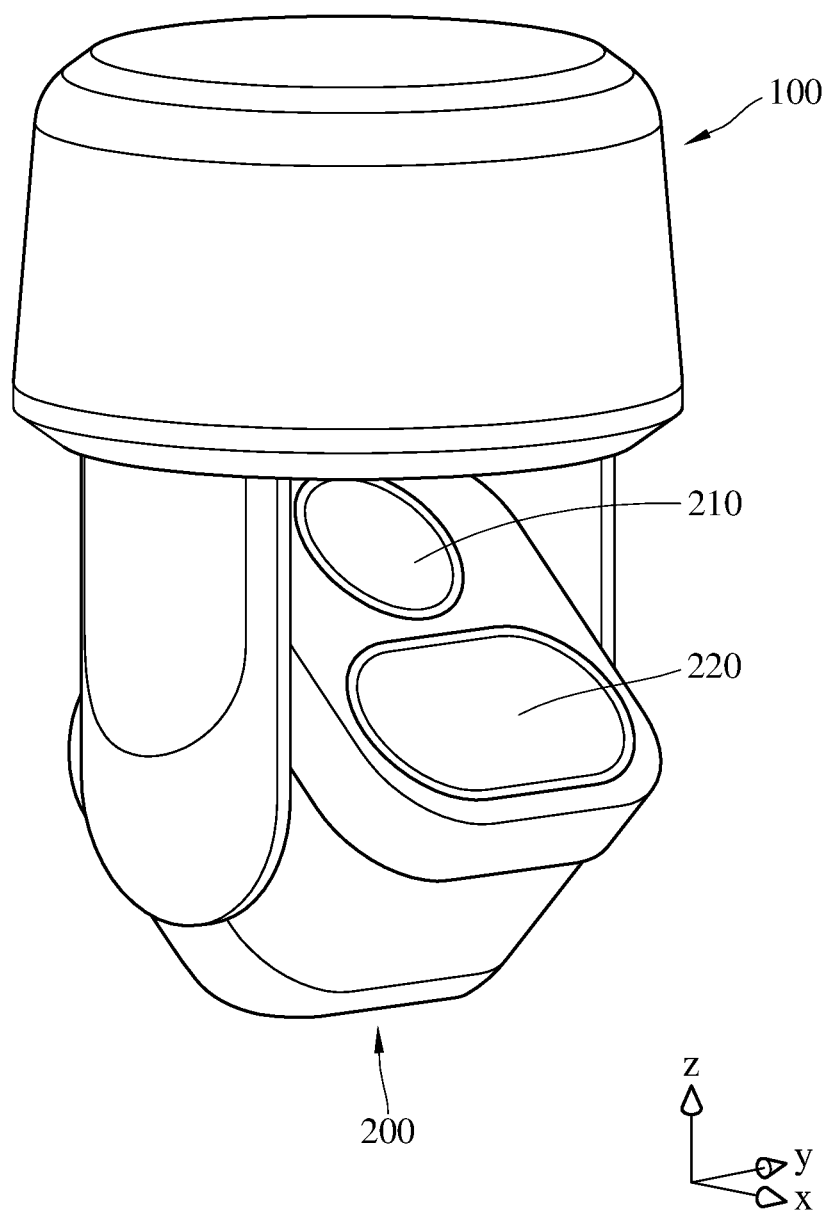
Figure 7:
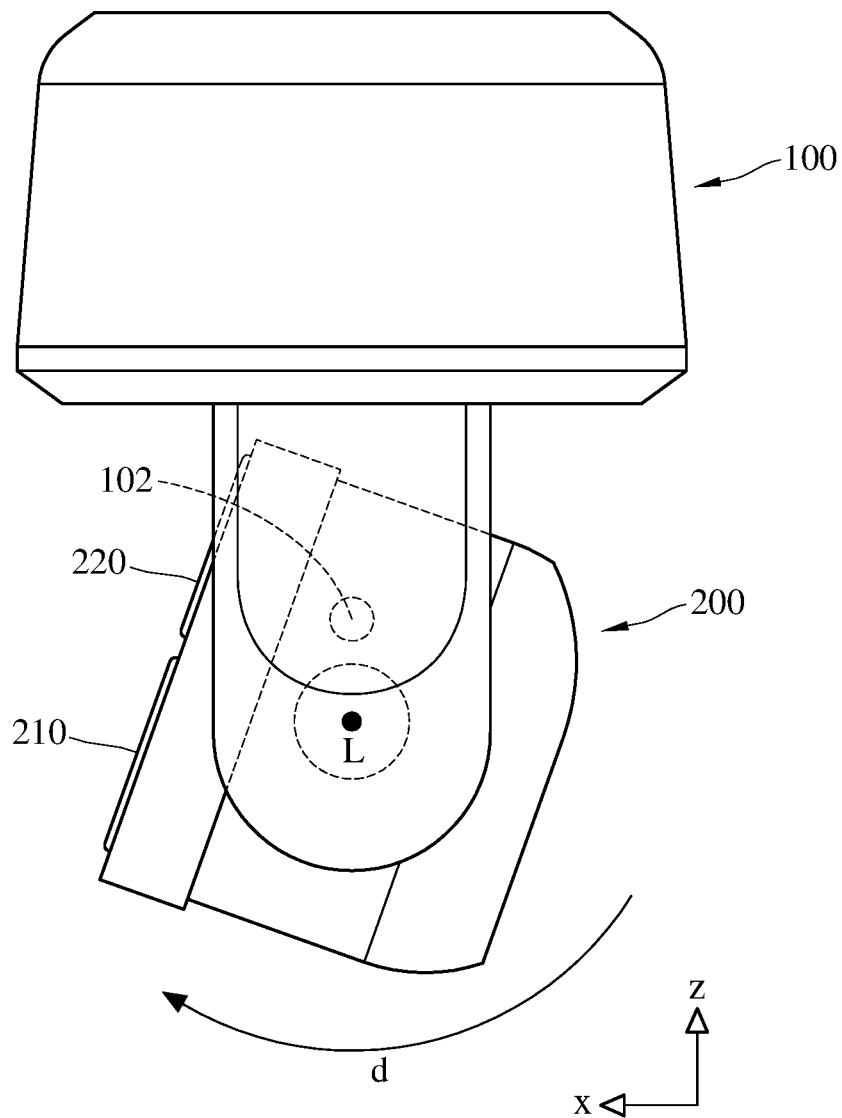

In addition, in this embodiment, when the main body 200 strikes the mounting bracket 100, the position of the lens shield 210 is higher than the position of the light shield 220 (as shown in FIG. 6). Thus, the rain drops removed from the surface of the light shield 220 are not flowing to the surface of the lens shield 210, thereby ensuring the clean performance to the surveillance camera 10.

Then, as shown in step S104, the relative position relationship between the main body 200 and the mounting bracket 100 is corrected. The purpose of step S104 is to remove the deviation of the relative position relationship between the main body 200 and the mounting bracket 100 caused by the striking between the main body 200 and the mounting bracket 100. Otherwise, there will be deviation in the following operation.

Then, as shown in step S105, the main body 200 is driven from the second stop end back to its original position in the first path (as the arrow d shown in FIG. 7) according to the position information as shown in step S101 in order to proceed the operation.

It is noted that step S105 is optional. In other embodiments, the main body 200 may not have to return to its original position after the step S104 is finished.

In addition, in this embodiment, the reason why the main body 200 is rotated to the prepared position (i.e. the main body 200 is located at the first stop end of the first path) is to ensure that there is a sufficient space for the main body 200 to rotate in order to achieve enough impact between the main body 200 and the mounting bracket 100. In other embodiments, the main body 200 may be driven to rotate in the first path directly from its current position to an end (the first stop end or the second stop end) away from the current position to strike the mounting bracket 100. It is noted that the main body 200 may be driven from its current position or a predetermined position in the first path, but the present disclosure is not limited thereto.

Figure 8:
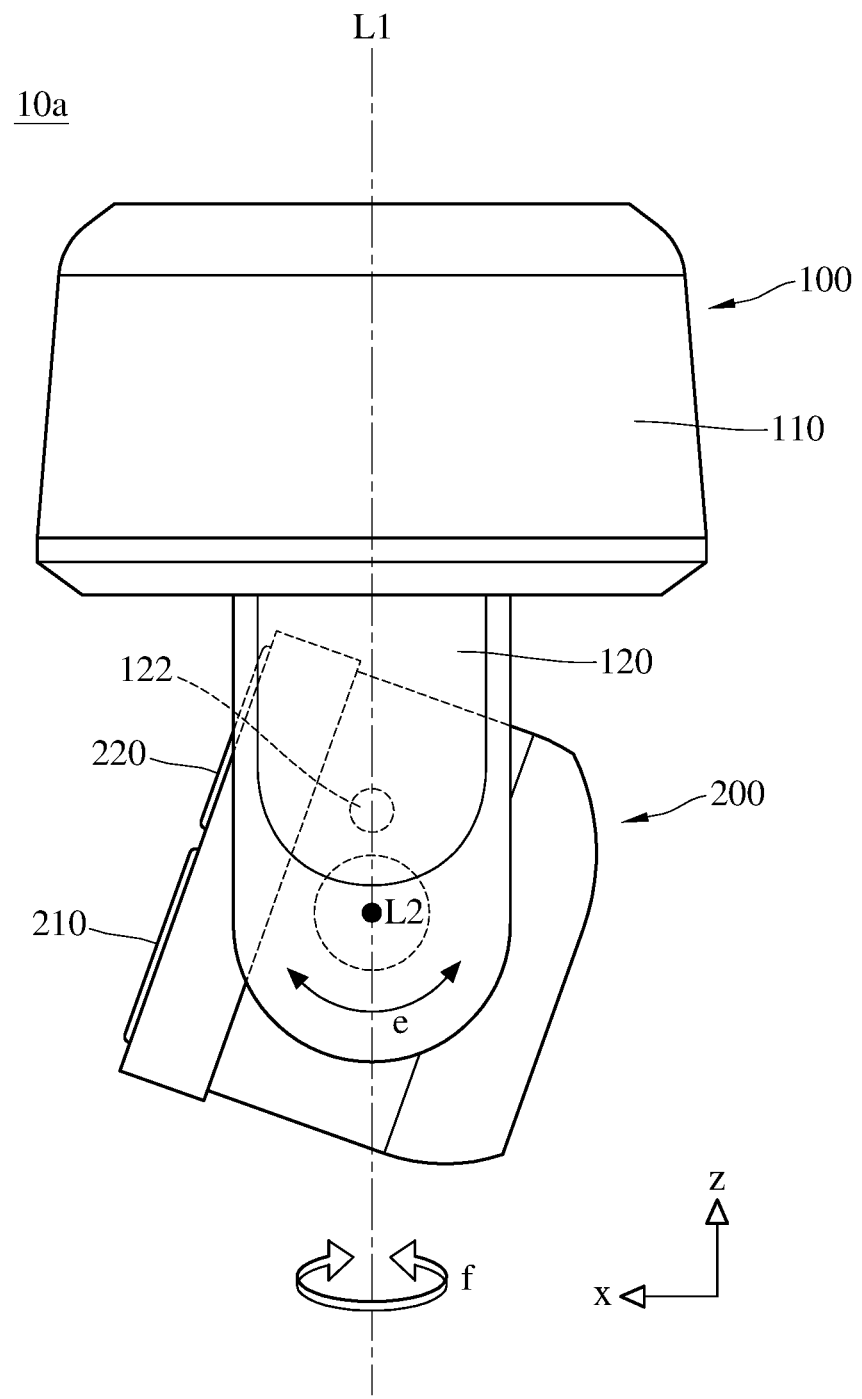
FIG. 8 is a planar view of a surveillance camera according to a second embodiment of the disclosure.

Please refer to FIG. 8, which is a planar view of a surveillance camera according to a second embodiment of the disclosure.

In this embodiment, a clean method for a surveillance camera 10a is provided. The surveillance camera 10a includes a mounting bracket 100 and a main body 200. The mounting bracket 100 includes a fixed part 110 and a rotatable part 120. The rotatable part 120 is rotatable relative to the fixed part 110 in a second path (as indicated by the path of arrow f shown in FIG. 8) with a first axis L1 taken as a rotating center. In addition, the main body 200 is rotatable relative to the rotatable part 120 in the first path (as indicated by the path of arrow e shown in FIG. 8) with a second axis L2 (the second axis L2 is perpendicular to the first axis L1). The main body 200 has a lens shield 210 and a light shield 220. A camera lens (not shown) inside the main body 200 is covered by the lens shield 210. A light source (not shown) inside the main body 200 is covered by the light shield 220.

In addition, the rotatable part 120 has a stopper 122. The first path has a first stop end and a second stop end, and the first stop end and the second stop end are respectively located on two sides of the stopper 122 opposite to each other. When the main body 200 strikes one of the two opposite sides of the stopper 122, the main body 200 is stopped by the stopper 122. There is no stopper in the second path, so the main body 200 is able to rotate in the second path relative to the mounting bracket 100 over 360 degrees.

In this embodiment, after a position information of the main body 200 relative to the mounting bracket 100 is recorded, the aforementioned clean method further includes a step of driving the main body 200 to rotate in the second path (as indicated by the path of arrow f shown in FIG. 8) relative to the mounting bracket 100 so as to ensure the clean performance to the surveillance camera 10 by centrifugal force.

According to the clean method for the surveillance camera as described above, the main body strikes the base to cause the main body to vibrate, thereby causing the vibration to directly remove rain drops or dust on the lens shield of the main body. As a result, the surveillance camera can be cleaned without using additional tools, such as wipers, so that the cost is reduced, and there is no scratch on the surface of the lens shield.

In addition, the second rotational speed is greater than the first rotational speed, and the second rotational speed is, for example, greater than or equal to 240 deg/s so as to increase the strength of the impact caused by the main body striking the mounting bracket and improve the clean performance to the surveillance camera.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A clean method for a surveillance camera, the surveillance camera comprising a mounting bracket and a main body rotatable relative to the mounting bracket so that the main body is rotatable around at least one rotation axis, the clean method comprising:
   driving the main body to rotate in a first path from a prepared position to an end of the first path, which is away from the prepared position, and to strike the mounting bracket to get the main body cleaned; and
   correcting a relative position relationship between the main body and the mounting bracket.

2. The clean method according to claim 1, wherein the step of driving the main body to rotate in the first path from the prepared position to the end of the first path, which is away from the prepared position and to strike the mounting bracket to get the main body cleaned, further comprising:
   driving the main body to rotate in the first path relative to the mounting bracket to the prepared position so that the main body is located at a first stop end of the first path; and
   driving the main body to rotate from the prepared position to a second stop end of the first path and to strike the mounting bracket to get the main body cleaned.

3. The clean method according to claim 2, wherein the main body is rotated relative to the mounting bracket to the first stop end of the first path at a first rotational speed, the main body rotates to the second stop end of the first path at a second rotational speed, and the second rotational speed is greater than the first rotational speed.

4. The clean method according to claim 3, wherein the second rotational speed is greater than or equal to 240 deg/s.

5. The clean method according to claim 2, wherein the mounting bracket has a stopper, the first stop end and the second stop end of the first path are respectively located on two sides of the stopper opposite to each other.

6. The clean method according to claim 2, wherein the mounting bracket has two stoppers respectively located at the first stop end and the second stop end of the first path.

7. The clean method according to claim 1, wherein before the step of driving the main body to rotate in the first path from the prepared position to the end of the first path, which is away from the prepared position and to strike the mounting bracket to get the main body cleaned, further comprising:

recording a position information of the main body relative to the mounting bracket.

8. The clean method according to claim 7, wherein after the step of correcting the relative position relationship between the main body and the mounting bracket, further comprising:

driving the main body back to an original position thereof according to the position information.

9. The clean method according to claim 7, wherein after the step of recording the position information of the main body relative to the mounting bracket, further comprising:

rotating the main body in a second path relative to the mounting bracket, wherein an axis of the second path is perpendicular to an axis of the first path.

10. The clean method according to claim 9, wherein the quantity of the at least one rotation axis is two, the two rotation axis respectively are a first axis and a second axis, which are perpendicular to each other, the mounting bracket comprises a fixed part and a rotatable part, the rotatable part is rotatable in the second path relative to the fixed part with the first axis taken as a rotating center, and the main body is rotatable in the first path relative to the rotatable part with the second axis taken as a rotating center.

11. The clean method according to claim 1, wherein the main body has a lens shield and a light shield, when the main body strikes the mounting bracket, the position of the lens shield is higher than the position of the light shield.

* * * * *